United States Patent Office 3,435,061
Patented Mar. 25, 1969

3,435,061
MANUFACTURE OF AROMATIC ALDEHYDES AND NITRILES
Robert K. Grasselli, Garfield Heights, and James L. Callahan, Bedford Heights, Ohio, assignors to The Standard Oil Company, Cleveland, Ohio, a corporation of Ohio
No Drawing. Filed Jan. 6, 1965, Ser. No. 423,818
Int. Cl. C07c 121/02
U.S. Cl. 260—465
13 Claims

ABSTRACT OF THE DISCLOSURE

A process for oxidizing vinyl substituted aromatic compounds to unsaturated nitriles with oxygen and ammonia over a catalyst comprising antimony oxide and at least one other polyvalent metal oxide.

---

The present invention relates to a process for the manufacture of monoolefinically unsaturated aromatic nitriles and aldehydes from certain substituted vinyl aromatic compounds. More particularly, it relates to a direct process for converting compounds having the structure

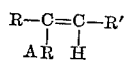

wherein R and R′ may each independently be a hydrogen and a methyl group and R and R′ are always different and wherein AR is an aromatic hydrocarbon radical selected from the group consisting of phenyl, naphthyl, anthryl, phenanthryl, to monoolefinically unsaturated aldehydes or to monoolefinically unsaturated nitriles. For example, α-methyl styrene may be converted to atroponitrile or to atropaldehyde, and similarly, β-methyl styrene may be converted to cinnamonitrile or cinnamaldehyde.

In the past, processes have been disclosed wherein the manufacture of atroponitrile, atropaldehyde, cinnamonitrile and cinnamaldehyde have been detailed. These prior art processes have generally involved several steps and relatively low yields of rather impure product were usually obtained.

U.S. Patent No. 2,478,990 discloses the reaction between phenylacetonitrile and formaldehyde to form condensation products, and then these products are pyrolized to produce atroponitrile. The first step requires several hours and the second step of slowly passing the viscous condensation product into a critically sensitive flash vaporization chamber is subject to considerable losses due to formation of resinous products.

Another U.S. Patent No. 2,362,049 discloses a method of preparing unsaturated nitriles containing an aromatic substituent in the alpha position which comprises treating the corresponding aromatic methyl ketone with hydrogen cyanide, acetylating the cyanhydrin so formed, then deacetylating the acetate to produce the alpha aromatic substituted acrylonitrile.

It is an object of this invention to produce directly from a vinyl aromatic compound such as α-methyl styrene the corresponding aldehyde and nitrile compounds such as atropaldehyde and atroponitrile. The object of this invention may be accomplished, for example, by reacting α-methyl styrene with a reactant such as (1) oxygen and (2) oxygen and ammonia in the presence of any one of several catalysts, and preferably a catalyst comprising antimony oxide as an essential ingredient in combination with at least one other polyvalent metal oxide, hereinafter more fully disclosed.

An effective catalyst for the purpose of this invention may be selected from the tin and antimony salts of phosphomolybdic and molybdic acids; the combined oxides of antimony and at least one selected from the group consisting of the oxides of uranium, tin, iron, cerium, manganese and thorium; bismuth silicomolybdate; bismuth silica phosphomolybdate; bismuth phosphotungstate; the combined oxides of antimony and uranium, antimony and tin, antimony and iron, antimony and thorium, antimony and cerium, antimony and manganese, promoted by one or more of the oxides of silver, barium, cobalt, copper, iron, iridium, molybdenum, niobium, nickel, platinum, bismuth, tin, tantalum, thorium, zinc and zirconium. Promoter metal oxides incorporated in the catalyst so as to comprise up to 15 percent by weight thereof, based on the weights of the elemental metals, may be used effectively, but amounts up to 5 percent by weight are preferred.

The catalyst useful in the present invention may be used alone or supported on or impregnated in a carrier material. Any suitable carrier material may be used, including silica, alumina, titania, boron phosphate, silicon carbide, pumice, diatomaceous earth, clay and the like. In general, the support will be employed in amounts less than 95% by weight of the final catalyst composition.

The catalyst may be prepared by any of the numerous methods of catalyst preparation which are known to those skilled in the art. For instance, the catalyst may be manufactured by co-gelling the various ingredients and drying, or by spray-drying, extruding or spherulizing in oil, as is well-known in the art.

The catalyst may be calcined to produce desirable physical properties such as attrition resistance, surface area and particle size. It is preferred that the calcined catalyst be further heat-treated in the presence of oxygen at an elevated temperature above 500° F. but below a temperature deleterious to the catalyst. For the purpose of the present invention, a catalyst having a particle size between 1 and 500 microns and a surface area in the range from 1 to 200 square meters per gram is preferred.

In the process for the manufacture of monoolefinically unsaturated aromatic nitriles and aldehydes embodied herein, the temperature may be any temperature in the range from 300 to 800° C. The preferred temperature range is 350 to 500° C.

The pressure at which the instant reaction is conducted is an important variable; a preferred pressure for conducting the reaction is from about 1 to 3 atmospheres so that the yield of undesirable by-products is minimized.

The apparent contact time employed in the process of this invention should be kept within certain limits to get good selectivity and yields. The apparent contact time may be defined as the time in seconds a unit volume of gas, measured at reactor conditions of temperature and pressure, is in contact with the apparent unit volume of catalyst. It may be calculated, for instance, from the apparent volume of the catalyst bed, the average temperature and pressure of the reactor, and the mass flow rate of the reaction mixture. The optimum contact time will depend upon the particular alkyl substituted aromatic hydrocarbons being oxidized or ammoxidized. A contact time from 0.01 to 25 seconds may be used, though a contact time of 0.1 to 15 seconds is preferred.

Molar ratios of air to the vinyl substituted aromatic hydrocarbon may vary from approximately 1:5 to 1:200. Ratios near the high limit make for poor selectivity, while ratios near the low limit decrease catalyst activity. Preferred molar ratios of air to hydrocarbon are in the range of 1:15 to 1:100.

No ammonia is present in the feed when the vinyl substituted aromatic is to be oxidized to the corresponding aldehyde, but only when the ammoxidation reaction producing the nitrile is to be conducted. In this latter case, up to 20 moles of ammonia per mole of hydrocarbon are found to be effective. For economic reasons, approximately stoichiometric quantities of hydrocarbon feed and ammonia are preferred.

Any molecular oxygen containing gas can be used in this process. Oxygen alone may be used without a diluent, although it is usually desirable to use in addition to oxygen at least one diluent such as steam, carbon dioxide, nitrogen and the inert gases. Any molar ratio of hydrocarbon to diluent within the range of 1:1 to 1:200 may be used, but the range from 1:25 to 1:125 gives satisfactory control of the reaction in either a fixed bed or fluidized bed reactor.

The equipment required for the reaction may be the standard type used for carrying out vapor phase oxidation reactions, such equipment being well-known to those skilled in the art. For the experimental work in the present invention, a tubular fixed bed reactor, equipped with an injection system was immersed in a molten salt bath. The gaseous reactants and diluents were introduced from pressurized containers fitted with pressure regulators, and the amount introduced was measured by flow meters.

The reactants are introduced into the reactor either at reaction temperature by first passing them through a preheater zone or by introducing them directly into the reactor and allowing them to come to reaction temperature as they travel through the catalyst bed.

The reaction products can be recovered by any desirable method. One method is the use of solvent scrubbers. A preferred method is the use of one or more Dry Ice traps in series which serve to isolate the reaction products by condensing them. The products of reaction were analyzed using standard techniques including gas chromatography, infrared analysis and nuclear magnetic resonance.

While only the preferred form of the invention is described in detail, it will be apparent to those skilled in the art that various modifications may be made therein without departing from the scope of the invention or the scope of the appended claims.

In the examples the following definitions are employed:

Percent conversion-carbon basis =

$$\frac{\text{Wt. of carbon in products of reaction}}{\text{Wt. of carbon in the propylene feed}} \times 100$$

The combined oxides of the polyvalent metals are referred to as the active phase of the catalyst and the silica carrier is referred to as the inactive phase. The weight percent of promoter metals referred to in the following examples corresponds to the ratio of the actual weight of the elemental metal present in the oxide or salt mixed into the unpromoted catalyst to the total weight of active phase, including the promoter metal oxide.

EXAMPLE 1

An antimony oxide-uranium oxide catalyst, supported on a silica carrier and incorporated a niobium oxide promoter was prepared in the following manner:

90 gms. of antimony metal were oxidized in 360 cc. of hot concentrated nitric acid. To this was added 81.4 gms. of uranyl nitrate, $UO_2(NO_3)_2 \cdot 6H_2O$, stirring until dissolved. To this hot mixture was added 228.4 gms. of Ludox HS (a sodium hydroxide stabilized suspension of 30% by weight silica in water) and sufficient concentrated ammonium hydroxide (28% solution) to bring the pH to 8. The slurry was filtered and washed with a 0.1% $NH_4OH$ solution. Into the wet filter cake was thoroughly mixed a water slurry of 3.42 gms. of niobium oxide and 100 gms. of water. This paste was dried overnight at 250° F., calcined for 24 hours at 800° F. and finally heat-treated at about 1700° F. for 8 hours. Subsequently, it was cooled, ground and screened to 20–35 mesh.

The reactor was maintained at a temperature of 410° C. and at substantially atmospheric pressure. A sufficient amount of catalyst, the preparation of which is described above, was placed in a conventional oxidation reactor so that a feed mixture comprising α-methyl styrene, ammonia, air and nitrogen, when introduced into the reactor, gave a contact time calculated to be 0.44 second.

The feed had the following composition:

| | Mol percent |
|---|---|
| α-Methyl styrene | 0.8 |
| Ammonia | 1.2 |
| Air | 40.0 |
| Nitrogen | 58.0 |

The conversions on the carbon basis were as follows:

| | Mol percent |
|---|---|
| Atroponitrile | 57.4 |
| Benzonitrile | 9.3 |
| Carbon dioxide | 1.4 |

The selectivity to atroponitrile was 85%.

When the unpromoted catalyst was used in the same reactor under the identical conditions as in the foregoing example, the conversion on the carbon basis of α-methyl styrene to atroponitrile was 54.1 percent.

When promoted or unpromoted catalysts were prepared as in the foregoing example, except that Ludox AS (an ammonia stabilized suspension of 30% by weight silica in water) was used instead of Ludox HS, and these catalysts were tested in the same reactor under substantially the same conditions as in the foregoing example, conversions of α-methyl styrene to atroponitrile comparable to that in Example 1 were obtained.

EXAMPLES 2–14

A series of runs was made using the antimony oxide-uranium oxide catalyst supported on a silica carrier and at least one of several metal oxide promoters incorporated therein as shown in Table I below. The antimony oxide-uranium oxide catalyst was composited with the silica carrier as described in Example 1 above. The mixture, having a pH of 8, was filtered and washed with water. The wet filter cake was thoroughly mixed with a solution of 2.97 grams of silver nitrate in 10 cc. of water. This paste was dried overnight at 120° C., then calcined for 24 hours at 800° F. and finally heat-treated for 8 hours at 1725° F. Subsequently it was cooled, ground and screened to 20–35 mesh. In a similar manner, other metallic salts were incorporated into the catalyst supported on silica. On heat treatment, as described above, the salts were converted to the oxides giving the combined oxides of antimony and uranium supported on a silica carrier and promoted by oxides of various promoter metals.

The reaction conditions were identical with those employed in Example 1. The molar ratio of air to α-methyl styrene was 50:1, the molar ratio of ammonia to α-methyl styrene was 1.5:1, the molar ratio of nitrogen to α-methyl styrene was 72.5:1. The results are reported in Table I below.

TABLE I

| Ex. No. | Percent promoter metal | Percent conversion, carbon basis | | | Percent selectivity to atroponitrile |
|---|---|---|---|---|---|
| | | Atroponitrile | Benzonitrile | $CO_2$ | |
| 2 | 0.98 platinum | 51.9 | 7.2 | 1.4 | 86 |
| 3 | 2.54 thorium | 46.8 | 5.8 | 0.6 | 88 |
| 4 | 2.47 zinc | 44.5 | 4.4 | 0.7 | 90 |
| 5 | 0.9 copper+0.9 tin | 43.1 | 5.1 | 0.7 | 88 |
| 6 | 1.11 tantalum | 42.7 | 5.2 | 0.7 | 88 |
| 7 | 2.81 nickel | 42.2 | 4.3 | 0.7 | 89 |
| 8 | 1.37 iridium | 40.4 | 5.1 | 0.7 | 88 |
| 9 | 2.99 silver | 39.0 | 5.8 | 0.8 | 86 |
| 10 | 3.39 iron | 38.6 | 5.8 | 2.0 | 83 |
| 11 | 2.9 barium | 36.2 | 6.6 | 1.4 | 82 |
| 12 | 13.4 zirconium | 34.0 | 5.9 | 0.8 | 84 |
| 13 | 4.9 cobalt | 31.2 | 5.0 | 0.6 | 85 |
| 14 | Unpromoted | 29.8 | 22.4 | 6.1 | 51 |

Several batches of the above-mentioned catalysts were prepared as described in Example 1 except that they were subjected to a special hardening step to increase their attrition resistance. This involved the ball-milling of the catalyst and the subsequent mixing into it Ludox HS solution (a sodium hydroxide stabilized suspension of 30% silica in water) so that the weight of the solution added was about 33% by weight of the paste. This paste was extruded, dried overnight at 250° F. and the temperature raised to about 1725° F. The catalyst was held at about 1725° F for 6 hours, cooled, ground and screened to 20–35 mesh. When these catalysts were tested in the same reactor under substantially the same conditions as in the foregoing example, comparable results were obtained.

Several other catalysts were tested in the same reactor under substantially the same conditions as in the foregoing example and were found useful though not necessarily equivalent. These catalysts included the following: the combined oxides of antimony and iron supported on silica, combined oxides of antimony and iron supported on silica promoted by at least one of the metal oxides (e.g., 1.12% tin, 1.16% molybdenum, 1% bismuth present as the oxides); the combined oxides of antimony and uranium supported on silica and promoted by at least one of the metal oxides (e.g., 2% bismuth, 4.8% copper, 1.0% indium, 1.4% cerium); the lead, tin and antimony salts of molybdic and phosphomolybdic acids; the antimony-bismuth salts of molybdic and phosphomolybdic acids; the antimony-bismuth salts of tungstic and phosphotungstic acids; the antimony-tin salts of molybdic acids; the lead-tin salts of phosphomolybdic acids; the combined oxides of antimony and thorium; the combined oxides of antimony and tin; the combined oxides of antimony and manganese; the combined oxides of antimony and cerium. These catalysts can also be given a special hardening step to increase their attrition resistance.

EXAMPLE 15

The conversion of α-methyl styrene to atropaldehyde was effected with an antimony oxide-uranium oxide catalyst supported on silica prepared in the following manner:

A mixture was prepared as in Example 1 above. This mixture was filtered and washed with water, dried overnight at 120° C., calcined for 24 hours at 800° F., and heat-treated for 8 hours at 1725° F. Subsequently, it was cooled and ground. 644 Grams of this catalyst were mixed with 373.3 grams of Ludox HS in a high speed, high shear blender; this paste was extruded onto aluminum foil, dried overnight at 120° C. and heat treated for 6 hours at 1825° F. The reactor was maintained at a temperature of 460° C. and at substantially atmospheric pressure. A sufficient amount of catalyst, the preparation of which is described above, was placed in a conventional oxidation reactor, so that a feed mixture comprising α-methyl styrene, air and nitrogen, when introduced into the reactor, gave a contact time calculated to be 0.51 second.

The feed had the following composition:

| | Mol percent |
|---|---|
| α-Methyl styrene | 0.8 |
| Air | 41.2 |
| Nitrogen | 58.0 |

The conversions on the carbon basis were as follows:

| | Mol percent |
|---|---|
| Atropaldehyde | 29.8 |
| Benzaldehyde | 8.0 |
| Carbon dioxide | Not determined |

The selectivity to atropaldehyde was 79%. Comparable conversions were obtained with the combined oxides of antimony and tin or the combined oxides of antimony and iron where these were supported on silica.

When the foregoing procedure was repeated, except that β-methyl styrene was used instead of α-methyl styrene comparable conversions to cinnamaldehyde were obtained.

EXAMPLE 16

The conversion of β-methyl styrene to cinnamonitrile was effected with an antimony oxide-uranium oxide catalyst, identical with that of Example 15. The unpromoted catalyst was ground and screened to 20–35 mesh. As in the previous example, a contact time of 0.51 second, a temperature of 460° C. and substantially atmospheric pressure were used.

The feed had the following composition:

| | Mol percent |
|---|---|
| β-Methyl styrene | 0.8 |
| Ammonia | 1.2 |
| Air | 40.0 |
| Nitrogen | 58.0 |

The conversions on a carbon basis were as follows:

| | Mol percent |
|---|---|
| Cinnamonitrile | 24.4 |
| Benzonitrile | 18.1 |
| Quinoline | 4.1 |
| Carbon dioxide | 7.4 |
| Carbon monoxide | 2.8 |

The selectivity to cinnamonitrile was 43.0%.

EXAMPLES 17–18

An unpromoted antimony oxide-uranium oxide catalyst, supported on a silica carrier was prepared as described in Example 1, except that the heat treatment was for 68 hours at about 1775° F. and, of course, no promoter was incorporated within the catalyst. The reaction was conducted in a fluidized bed reactor at about 410° C. using a contact time calculated as about 4.6 seconds. The molar ratios of α-methyl styrene/NH$_3$/air were set at 1/1.5/60 and were maintained at substantially the same level in each of the two examples shown in Table II below. Example 18 demonstrates that the reaction may also be carried out in the presence of water (in the form of steam).

TABLE II

| Example No. | Catalyst | Mols water added to feed stream | Atroponitrile | Benzonitrile | CO$_2$ | CO | Percent selectivity to atroponitrile |
|---|---|---|---|---|---|---|---|
| 17 | Antimony oxide and uranium oxide on silica carrier. | None | 29.2 | 13.9 | 8.2 | 3.1 | 54 |
| 18 | | 10 | 22.1 | 11.5 | 9.6 | 3.4 | 41 |

We claim:
1. A process for the preparation of a nitrile having the structure

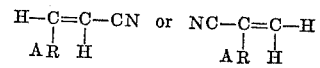

wherein AR is one of the following moieties: phenyl, naphthyl, anthryl or phenanthryl, comprising reacting a monoolefinically substituted aromatic hydrocarbon having the structure

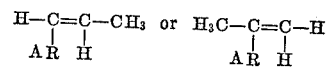

wherein AR are the same as hereinabove, with ammonia and oxygen over a catalyst selected from the group consisting of:

antimony and tin salts of molybdic and phosphomolybdic acid;
bismuth silicomolybdate;
bismuth silicophosphomolybdate;
bismuth phosphotungstate;

antimony bismuth salts of molybdic and phosphomolybdic acids;
antimony bismuth salts of tungstic and phosphotungstic acids;
lead tin salts of phosphomolybdic acids;
combined oxides of bismuth molybdenum and phosphorous promoted by the oxides of barium and silicon in an amount up to about 15% by weight of catalyst;
combined oxides of antimony and at least one member selected from the group consisting of the oxides of uranium, tin, iron, cerium, manganese and thorium or the foregoing combined oxides promoted by at least one of the oxides of the following metals: silver, barium, bismuth, cobalt, copper, iridium, molybdenum, niobium, nickel, platinum, tantalum, zinc and zirconium, in an amount up to about 15% by weight of catalyst; at about 1 to 3 atmospheres pressure and at a temperature in the range of 300° C. to 800° C.

2. The process of claim 1 in which the reactants are α-methyl styrene ammonia and oxygen.

3. The process of claim 1 in which the reactants are β-methyl styrene ammonia and oxygen.

4. The process of claim 1 in which the molar ratio of α-methyl styrene to air is in the range from 1:5 to 1:200 and the molar ratio of α-methyl styrene to ammonia is in the range of 1:0.1 to 1:5.

5. The process of claim 1 in which the molar ratio of β-methyl styrene to air is in the range from 1:5 to 1:200 and the molar ratio of β-methyl styrene to ammonia is in the range from 1:0.1 to 1:5.

6. The process of claim 1 in which the catalyst consists essentially of the oxides of antimony and uranium.

7. The process of claim 1 in which the catalyst consists essentially of the oxides of antimony and uranium and is promoted by at least one member selected from the group consisting of the oxides of silver bismuth, cobalt, copper, iron, iridium, molybdenum, niobium, nickel, platinum, tin, tantalum, thorium, zinc and zirconium.

8. The process of claim 1 in which the operating pressure is at about atmospheric pressure.

9. The process of claim 1 in which the operating temperature is in the range of 350 to 500° C.

10. The process of claim 1 in which the catalyst is a fixed bed, pelletized catalyst.

11. The process of claim 1 in which the catalyst is a fluidized bed, spherulized catalyst.

12. The process of claim 1 in which the apparent contact time is in the range of 0.1 to 15 seconds.

13. The process of claim 1 wherein said catalyst is promoted with from 0.1 to 15 percent by weight of promoter oxide.

References Cited

UNITED STATES PATENTS

| | | | |
|---|---|---|---|
| 2,904,580 | 9/1959 | Idol | 260—465.3 |
| 3,186,955 | 6/1965 | Callahan et al. | 260—465.3 X |
| 3,198,750 | 8/1965 | Callahan et al. | 260—465.3 X |
| 3,200,081 | 8/1965 | Callahan et al. | 260—465.3 X |
| 3,200,141 | 8/1965 | Milberger | 260—465.3 |
| 3,226,421 | 12/1965 | Giordano et al. | 260—465.3 |
| 3,248,340 | 4/1966 | Callahan et al. | 260—465.3 |

JOSEPH P. BRUST, Primary Examiner.

U.S. Cl. X.R.

260—283, 599